United States Patent [19]

Kuroiwa et al.

[11] Patent Number: 4,612,895
[45] Date of Patent: Sep. 23, 1986

[54] FUEL FLOW DETECTOR AND FUEL CONTROLLER USING FUEL FLOW DETECTOR

[75] Inventors: Hiroshi Kuroiwa, Hitachi; Yutaka Nishimura; Yoshishige Oyama, both of Katsuta, all of Japan

[73] Assignee: Hitachi, Ltd., Tokyo, Japan

[21] Appl. No.: 647,660

[22] Filed: Sep. 6, 1984

[30] Foreign Application Priority Data

Sep. 7, 1983 [JP] Japan ................................. 58-163121

[51] Int. Cl.$^4$ ................................................ F02B 3/00
[52] U.S. Cl. .................................... 123/494; 73/861.02
[58] Field of Search .................... 123/494, 478, 438; 323/365; 307/353, 179 L; 73/861.02

[56] References Cited
U.S. PATENT DOCUMENTS

| | | | |
|---|---|---|---|
| 4,125,093 | 11/1978 | Platzer, Jr. .......................... | 123/494 |
| 4,231,345 | 11/1980 | Draus et al. ......................... | 123/494 |
| 4,334,186 | 6/1982 | Sasayama et al. .................. | 123/494 |
| 4,408,589 | 10/1983 | Hauher et al. ....................... | 123/494 |
| 4,411,234 | 10/1983 | Middleton ........................... | 123/494 |
| 4,442,818 | 4/1984 | Kashiwaya et al. ................. | 123/494 |
| 4,526,148 | 7/1985 | Narasaka et al. .................... | 123/494 |

Primary Examiner—Raymond A. Nelli
Attorney, Agent, or Firm—Antonelli, Terry & Wands

[57] ABSTRACT

In order to take into consideration the different response by a hot wire sensor to changes in temperature of air as opposed to changes in temperature of fuel, the circuit configuration of a hot wire sensor for fuel flow detection differs from that for air flow detection in that an additional resistance is connected in series with the flow measuring resistance in the bridge circuit of the fuel flow detector, while the additional resistance is connected in series with the temperature compensating resistance in the bridge circuit of the air flow detector.

4 Claims, 18 Drawing Figures

FUEL FLOW DETECTOR AND FUEL CONTROLLER USING FUEL FLOW DETECTOR

FIELD OF THE INVENTION

This invention relates to a fuel flow detector and a fuel controller using the fuel flow detector.

BACKGROUND OF THE INVENTION

A flow sensor for measuring the quantity of air sucked in internal combustion engines is proposed in various types, however, that in service actually comes in, for example, a moving vane system, a Karman's vortex system and a hot wire (or film) system specified in SAE Paper 811428.

Then, where the rate of fuel fed into internal combustion engines is to be measured by means of such flow sensor, it is preferable that an air measuring sensor and a fuel measuring sensor be used in the same type from the industrial viewpoint.

However, in the case of the above-mentioned moving vane system and Karman's vortex system, it is difficult to dispose a detecting unit in a fuel passage for its being large-sized, which is not to meet feasibility.

On the contrary, the hot wire (or film) system is capable of having the detecting unit being small-sized disposed in the fuel passage.

However, when the hot wire (or film) system is employed as air measuring sensor and fuel measuring sensor, it is found that since fluids to be measured are different each other, a detection output is given in an erroneous value from connecting a detection circuit to which the air measuring sensor is connected straight to the fuel measuring sensor.

OBJECT OF THE INVENTION

An object of this invention is to provide a fuel flow detector capable of detecting the rate of fuel accurately.

Another object of the invention is to provide a fuel controller capable of obtaining a fuel-air ratio at high precision by means of the above fuel flow detector.

SUMMARY OF THE INVENTION

The invention is characterized by:

a fuel flow detector, comprising (a) a flow measuring resistance disposed in a fuel passage and having a relation in which a resistance value holds positive to a temperature;

(b) a temperature compensating resistance disposed in the fuel passage and having a relation in which a resistance value holds positive to a temperature;

(c) a detecting means for detecting a potential produced by the flow measuring resistance to an output signal;

(d) a current controlling means for comparing the potential produced by the flow measuring resistance with a potential produced by the temperature compensating resistance and controlling a current flowing into the flow measuring resistance so as to minimize the deviation;

(e) an additional resistance connected in series or parallel with the flow measuring resistance;

or a fuel flow detector, comprising (a) a flow measuring resistance disposed in a fuel passage and having a relation in which a resistance value holds negative to a temperature;

(b) a temperature compensating resistance disposed in the fuel passage and having a relation in which a resistance value holds negative to a temperature;

(c) a detecting means for detecting a potential produced by the flow measuring resistance to an output signal;

(d) a current controlling means for comparing the potential produced by the flow measuring resistance with a potential produced by the temperature compensating resistance and controlling a current flowing into the flow measuring resistance so as to minimize the deviation;

(e) an additional resistance connected in series or parallel with the temperature compensating resistance.

Further, the invention is characterized otherwise by a fuel controller, comprising:

(a) an air detecting means consisting of a first flow measuring resistance disposed in a suction air passage and having a temperature dependency characteristic and a first temperature compensating resistance having a temperature dependency characteristic similar to the first flow measuring resistance;

(b) a fuel detecting means consisting of a second flow measuring resistance disposed in a fuel passage and having a temperature dependency characteristic similar to the first flow measuring resistance and a second temperature compensating resistance;

(c) a correcting means provided on the air detecting means and the fuel detecting means so as to minimize a ratio $\Delta Ta/\Delta Tf$ of a temperature difference $\Delta Ta$ between the first flow measuring resistance and the first temperature compensating resistance to a temperature difference $\Delta Tf$ between the second flow measuring resistance and the second temperature compensating resistance in accordance with a temperature rise;

(d) a controlling means for generating a control signal to regulate the flow of fuel so that signals of the air detecting means and the fuel detecting means are related as predetermined with each other;

(e) a fuel flow regulating means for controlling fuel flowing in the fuel passage according to the control signal of the controlling means.

EMBODIMENT OF THE INVENTION

Referring now in detail to one preferred embodiment of this invention, an outline of the fuel controller using a fuel flow detector according to this invention will be described first.

Figure 1:
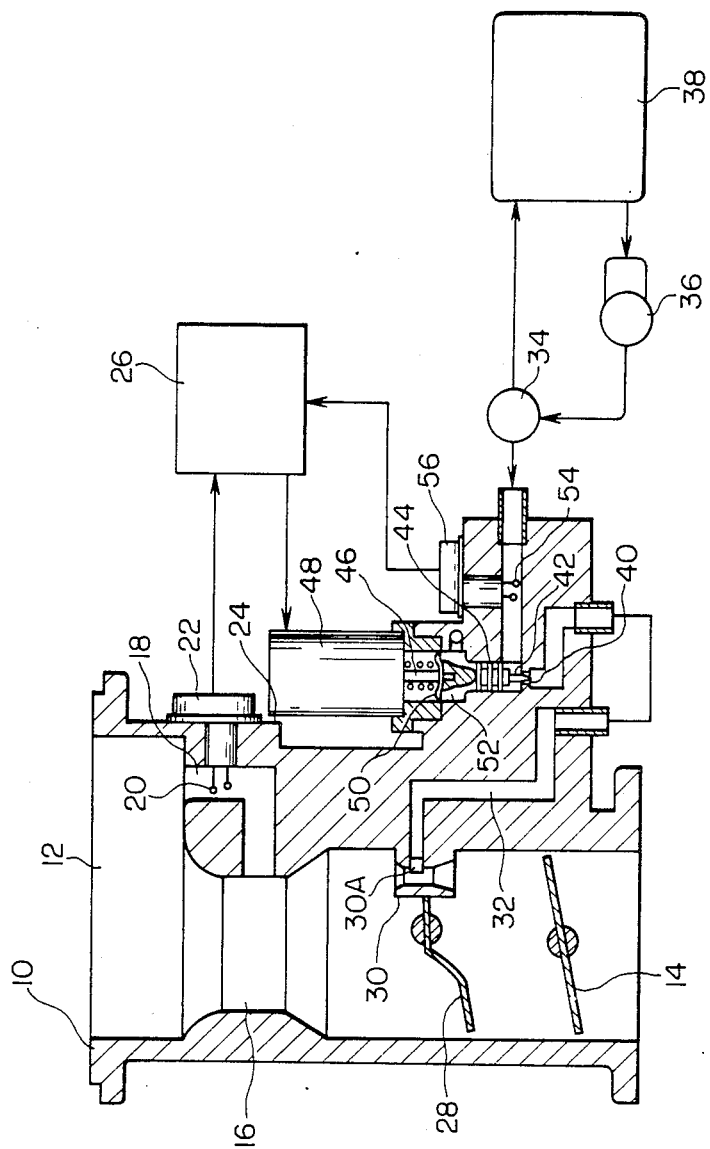
FIG. 1 is a schematic diagram representing one preferred embodiment of this invention.

In FIG. 1, a reference numeral 10 denotes a body constituting a fuel feeder, through which a suction air passage 12 passes. A throttle valve 14 interlocking with an accelerator pedal is provided in the suction air passage 12, and a venturi 16 is formed further upstream. An upstream part of the venturi 16 and the narrowest part of the venturi 16 communicate with each other through a by-pass air passage 18, and a hot wire sensor 20 is disposed midway thereof as an air detector. A driving/processing circuit 22 of the hot wire sensor 20 is mounted solidly on a wall 24 of the body 10, and an output of the driving/processing circuit 22 is inputted to a control unit 26. An arrangement is such that the control unit 26 computes a control signal to operate an actuator 48 according to the input signal and amplifies the control signal to output to the actuator 48.

On the other hand, an auxiliary valve 28 operating on dynamic pressure of an air stream or in interlocking with the throttle valve 14 is provided in the suction air passage 12 between the throttle valve 14 and the venturi 16. The auxiliary valve 28 is notched at its one end, thereby enclosing a fuel feed venturi 30 in the notch when an opening of the auxiliary valve 28 gets small. A fuel nozzle hole 30A opens to the fuel feed venturi 30.

The fuel feed venturi 30 is kept communicating with a fuel tank 38 through a fuel passage 32, a fuel pressure regulator 34 and a fuel pump 36. A fuel measuring unit is constituted of a fuel orifice 40 and a fuel valve 42 for adjusting an opening area of the fuel orifice 40. The fuel valve 42 has a plurality of collars 44 as illustrated, thus constituting a labyrinth. A stroke change is given to the fuel valve 42 by the actuator 48. An electrical quantity/mechanical quantity converter for deriving a linear mechanical quantity from an electrical signal is preferable as the actuator 48, and, for example, a proportional electromagnetic unit and a stepping motor having a mechanism for converting a rotational motion into a linear motion are employed therefor. Here, the proportional electromagnetic unit, namely a proportional solenoid is used as the actuator 48. Then, an output shaft 46 of the actuator 48 is constituted separately so as to drive the fuel valve 42 smoothly.

A bellophragm 50 is fixed on the output shaft 46 driving the fuel valve 42, and the bellophragm 50 is further fixed on the body 10, thereby preventing a fuel from leaking to the actuator 48 side.

Figure 2:
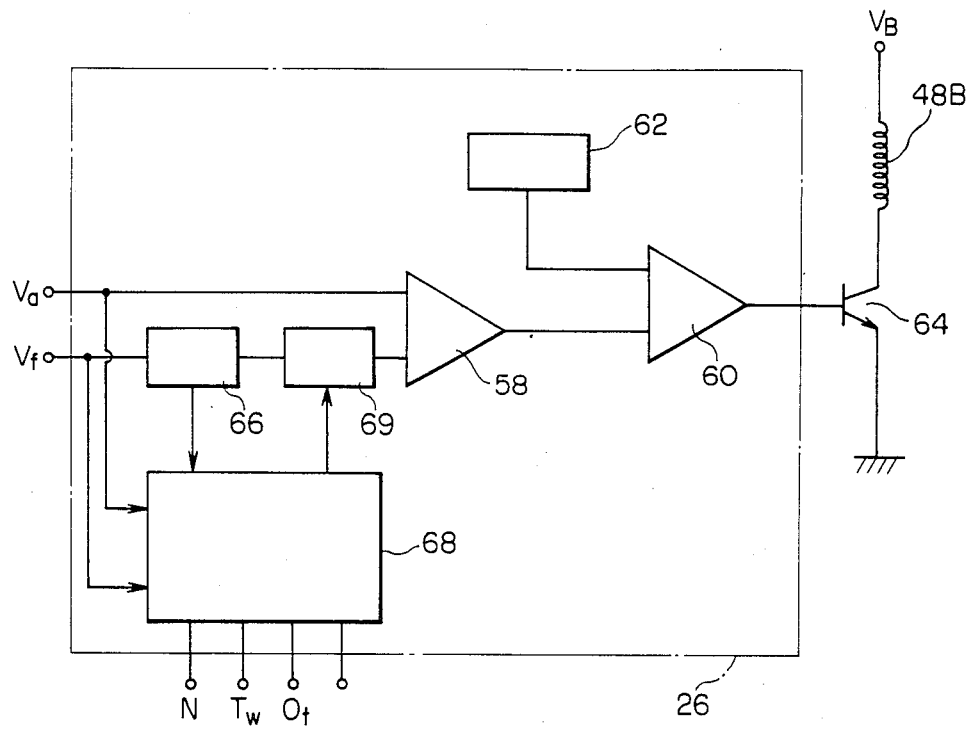
FIG. 2 is a detailed schematic circuit diagram of a control unit 26.

On the other hand, an upper part of the collar unit 44 formed on the fuel valve 42 and a fuel reservoir 52 formed at a fuel side of the bellophragm 50 are kept communicating with each other so as to return the fuel leaking from the measuring unit through the collar unit 44 of the fuel valve 42 from a fuel return pipe to the fuel tank 38. As the fuel flow detector, a hot wire sensor 54 is disposed in the fuel passage between the fuel measuring unit and the fuel pressure regulator 34. A driving/processing circuit 56 of the hot wire sensor 54 for fuel flow detection is mounted on the body 10 solidly, and its output is inputted to the control unit 26. The control unit 26 is constituted as illustrated in FIG. 2. An air flow signal Va detected on the hot wire sensor 20 (hereinafter called "air flow sensor") provided in the by-pass air passage 18 and a fuel flow signal Vf detected on the hot wire sensor 54 (hereinafter called "fuel flow sensor") provided in the fuel passage are inputted to a differential amplifier 58. In this case, output characteristics of both the sensors are adjusted beforehand to the even value in an output value at the time of zero flow rate and an output value at the time of maximum flow rate (the fuel flow rate being adjusted by the rate which becomes a theoretical air-fuel ratio at the time of maximum air flow rate) through a zero span circuit provided on both driving/processing circuits 22, 56. Next, a deviation value between both the signals inputted to the differential amplifier 58 is inputted to a comparator 60, a voltage duty pulse corresponding to the deviation value is outputted according to a triangular wave from a reference triangular wave generator 62, and thus a coil 48B of the actuator 48 (proportional solenoid) through a power transistor 64. According to the above constitution, the ratio can be controlled nearly to a theoretical air-fuel ratio basically, however, it is next to impossible that output characteristics of both the air flow sensor and fuel flow sensor are made coincident perfectly with each other in every flow zones. To cope with the above situation, an available means will be taken up between:

(a) a method wherein flow rate values to both the outputs are stored in a microcomputer, and when the signals $V_a$, $V_f$ are inputted to the microcomputer, output signals corrected from the flow rate values corresponding to the input signals are outputted, and (b) a method wherein the other output characteristic is corrected on a function generator or the like so as to coincide with one output characteristic.

The embodiment given in FIG. 2 represents the case where the method (b) is employed. That is, the signal $V_f$ is made to coincide with the signal characteristic $V_a$.

Next, in case an air-fuel ratio higher than the theoretical air-fuel ratio is required like engine start-up operation domain and output operation domain, a value to add to an adder 69 from signals of an engine rotational frequency N, a cooling water temperature $T_w$, a throttle valve opening $\theta_t$ and the like which are inputted to a microcomputer 68 and the signals $V_a$, $V_f$ is outputted through arithmetic operation or map processing, and a false fuel signal $V_f'$ is inputted to the differential amplifier 58.

In the fuel controller constituted as above, the operation will be described next.

When the engine is operated, air flows in the suction air passage 12, and there arises a pressure difference between the venturi 16 and an upstream zone of the venturi 16. Accordingly, the air flows from the upstream zone of the venturi 16 to the venturi 16 through the by-pass air passage 18. Thus the hot wire sensor 20 detects a quantity of the air according to the air flow. The detection signal $V_a$ is inputted to the differential amplifier 58, and where $V_f$ has not changed, the deviation increases, an on-time width of the duty pulse becomes large due to the comparator 60, and thus a stroke operation is given to the actuator 48. The fuel valve 42 shifts upward according to the predetermined stroke, and an opening area constituted together with the fuel orifice 40 gets large to increase the fuel quantity. The fuel quantity is detected on the fuel flow sensor 54, and the close loop control operation is repeated until a fuel quantity signal corresponding to the air quantity signal, or the deviation from the comparator 58 is zeroised.

Figure 3:
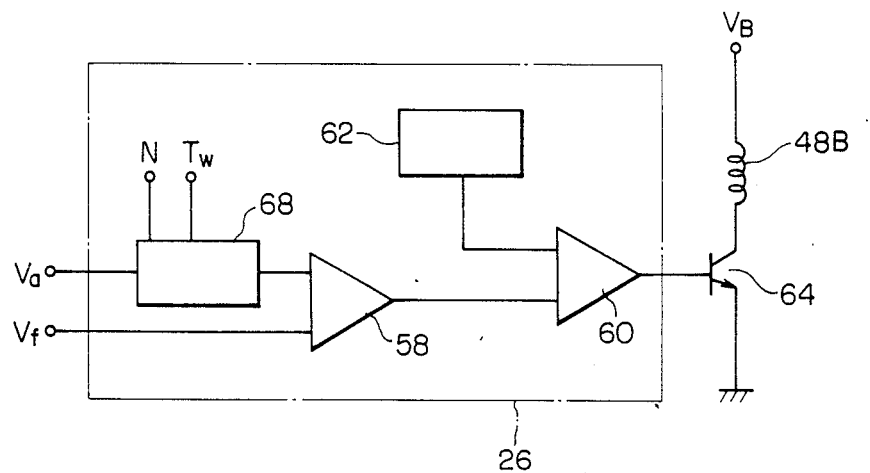
FIG. 3 is a schematic circuit diagram of a variant of the control unit of FIG. 2.
Figure 5:
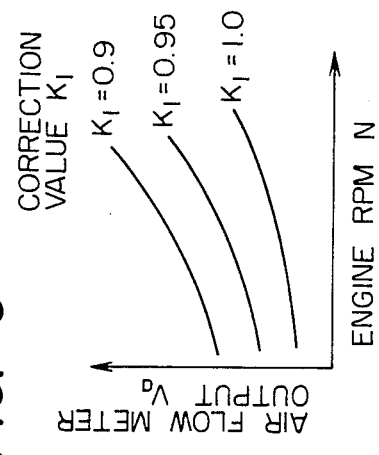
FIG. 5 and FIG. 6 are tables for correction values $K_1$, $K_2$.
Figure 6:
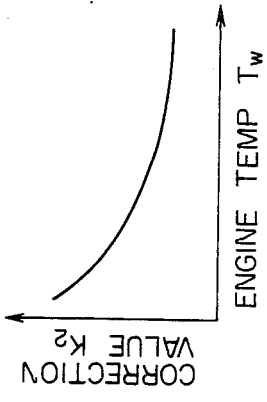
Figure 4:
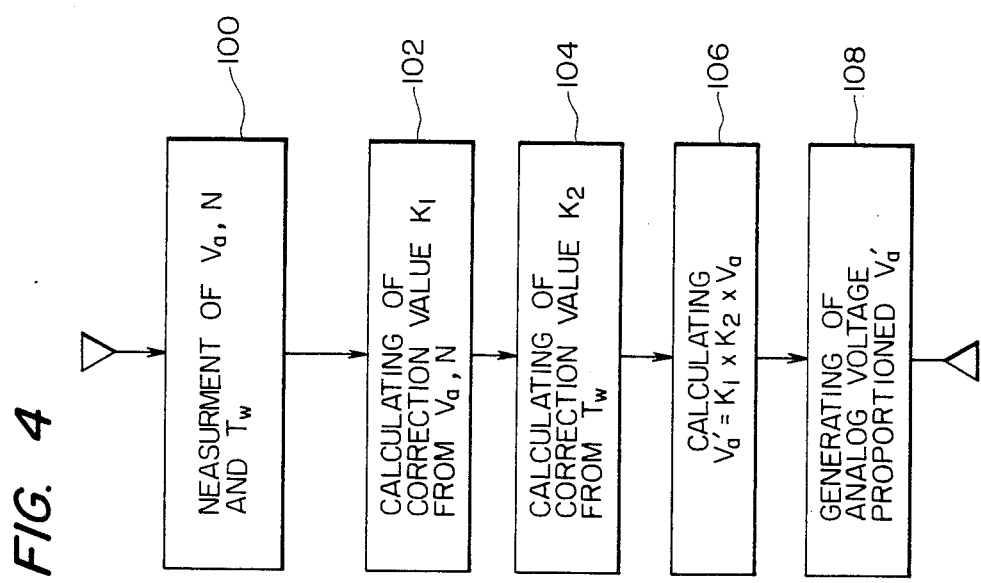
FIG. 4 is a flowchart for correction of an air flow signal Va.

FIG. 3 represents a variant example of FIG. 2, wherein the air flow signal $V_a$ is corrected by engine operating conditions (engine rotational frequency N, engine cooling water temperature $T_w$ and the like) to obtain $V_a'$, and the actuator 48 constituted of a proportional solenoid is driven by the power transistor 64 so that the fuel flow signal $V_f$ and the corrected air flow signal $V_a'$ are equalized as in the case of FIG. 2. A flowchart for correction of the air flow signal $V_a$ in the microcomputer 68 is shown in FIG. 4, and examples of correction values $K_1$, $K_2$ are shown in FIG. 5 and FIG. 6, respectively. First, the air flow signal $V_a$, the engine rotational frequency N and the cooling water temperature $T_w$ are inputted at every constant time or constant crank angle at Step 100, and then the correction value $K_1$ is obtained from $V_a$ and N by means, for example, of a table of FIG. 5, at Step 102. Consecutively, the correction value $K_2$ is obtained at Step 104 from the table shown in FIG. 6, and the corrected air flow signal $V_a'$ is obtained at Step 106 as the product of $K_1$, $K_2$, $V_a$. Further, $V_a'$ is outputted to the differential amplifier 58 at Step 108 as an analog signal.

According to this method, an output operation domain, a start-up operation domain, an operation domain important for exhaust control, an operation domain important for decrease in fuel consumption and the like can be decided from the air flow signal $V_a$ and the engine rotational frequency N, thereby setting arbitrarily the air-fuel ratio of a mixture to feed. Not so illustrated, but an ignition timing and an exhaust reflux rate can also be set arbitrarily from $V_a$ and N. Further, the fuel flow is generally a steady-state current at each operating condition in this system, however, the air flow is a pulsating current according to a piston reciprocation of the engine. Furthermore, under the condition wherein the throttle valve is opened full at a low rotational frequency of the engine, the air flow becomes a pulsating current accompanied by a counterflow, therefore a measuring precision of the air flow rate exceedingly deteriorates as compared with a measuring precision of the fuel flow rate. However, the deterioration in measuring precision of the air flow has a constant inclination according to operating conditions of the engine, therefore a value almost approximate to the true air flow rate will be obtainable from correction according to the engine operating condition. That is, the correction value $K_1$ of FIG. 3 is capable of setting an arbitrary air-fuel ratio and is also a correction coefficient for obtaining the true air flow rate.

Figure 7:
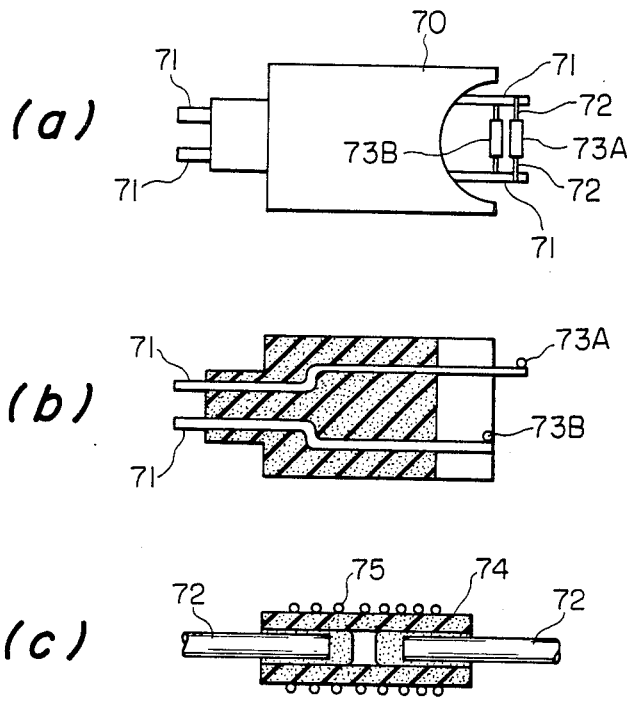
FIG. 7 is a diagram of a flow detecting unit of a fuel flow meter of one embodiment of this invention.

An outline of the fuel controller using a fuel flow detector has been described as above, and the next then refers to structure and circuit configuration of the hot wire sensor. FIG. 7 shows a structure of the hot wire sensor. Almost similar one is used for both air quantity and fuel quantity. FIG. 7 (a) is a surface appearance view, wherein a signal extracting support rod 71 is embedded in a resin 70 having an electric insulating property. A heating resistor 73 is installed at the tip of the support rod 71 through a lead wire 72. FIG. 7 (b) is a sectional view thereof, wherein the heating resistor 73 is constituted of a flow detecting resistor 73A and a temperature compensating resistor 73B. FIG. 7 (C) is a detailed drawing of the heating resistor 73, wherein a fine platinum wire 75 is wound on a hollow ceramic bobbin 74 with its both ends connected to the lead wire 72. Then, a glass coating is applied on the winding part so as to keep dust or the like from depositing thereon. Here, a platinum thin film can be used instead of the platinum wire 75.

Figure 8:
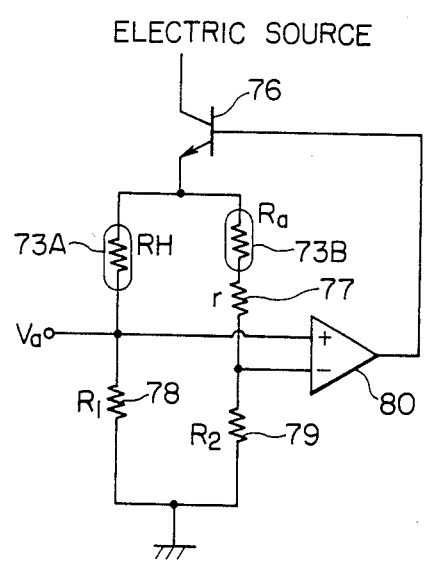
FIG. 8 is a schematic circuit diagram of a hot wire type flow meter.

A driving/processing circuit connected to the heating resistors 73A, 73B will be described next. FIG. 8 represents the case for air flow detecting. Wheatstone bridge is formed of the flow detecting resistor 73A having a resistance value of temperature dependency, the temperature compensating resistor 73B, and fixed resistances 78, 79, a supply current to the flow detecting resistor 73A is adjusted to close loop control by the differential amplifier 80 and the transistor 76 so as to reduce to zero or null the potential difference at a midpoint of the bridge, and the supply current is made to function as an air flow signal. Here, in case the air temperature changes, the air temperature is detected on the temperature compensating resistor 73B, a difference between the flow detecting resistor temperature and the air temperature is kept almost constant irrespective of the air temperature, thereby keeping a detection precision of the air flow from an influence of the air temperature. Strictly speaking, however, one side of the bridge is constituted of a series connection of the temperature compensating resistor 73B and a fixed resistance 77 under the following conception. Let it be assumed that $R_H$ stands for a resistance value of the flow detecting resistor 73A, $R_a$ stands for a resistance value of the temperature compensating resistor 73B, and resistors of 73A, 73B are formed of platinum, copper, nickel and the like, then a relation between the temperature and the resistance value will be given by the following expression:

$$\left. \begin{array}{l} R_H = R_{H0}(1 + \alpha T_W) \\ R_a = R_{a0}(1 + \alpha T_a) \end{array} \right\} \quad (1)$$

where
$T_w$: temperature of the flow detecting resistor
$T_a$: temperature of the temperature compensating resistor
$R_{HO}$, $R_{aO}$: resistance values of 73A, 73B when the temperature is 0° C.
$\alpha$: temperature coefficient of resistance value Then, if I stands for a supply current to the flow detecting resistor 73A, a quantity of radiation of the resistor 73A will be given by the following expression:

$$I^2 R_H = h(T_W - T_a)S \quad (2)$$

where
h: heat transfer coefficient from resistor 73A to air current
S: surface area of resistor 73A Here, the heat transfer coefficient h in the expression (2) is a function of mass of a fluid, velocity of flow and property value, which is given, for example, by the following expression:

$$h = \frac{\lambda}{D}\left\{ 0.42\, P_r + 0.57\, P_r^{0.33} \left(\frac{\rho u D}{\rho v}\right)^{0.5} \right\} \quad (3)$$

-continued $$= A + B\sqrt{\rho u}$$

where
λ: heat transfer rate of fluid
D: diameter of resistor
$P_r$: Prandtl number of fluid
ν: kinematic coefficient of viscosity of fluid
u: velocity of flow of fluid
ρ: density of fluid Then, in case a potential difference at midpoint of the bridge is zero, the following relation holds from a balance condition of the bridge:

$$R_H \cdot R_2 = R_1 \cdot (R_a + r) \quad (4)$$

where $R_1$, $R_a$, r: resistance values of fixed resistances 78, 79, 77.

Further, the signal $V_a$ is $V = I \cdot R_1$, and from expressions (1), (2), (3):

$$V_a^2 = \frac{R_1^2 S}{\alpha} \cdot (A + B\sqrt{\rho u}) \cdot \left\{ \frac{1}{R_{H0}} + \frac{R_2}{R_1 R_{a0}} \left( \frac{-1}{r/R_a + 1} \right) \right\} \quad (5)$$

Figure 10:
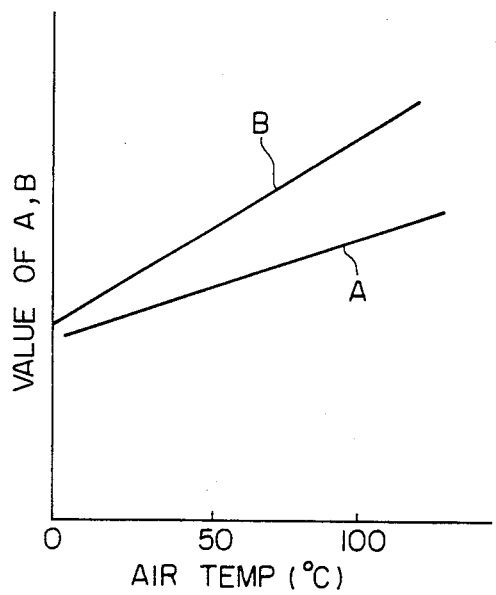
FIG. 10 and FIG. 11 are explanatory drawings of a temperature dependency characteristic of heat transfer coefficients.

In the expression (5), $(R_1^2 S)/\alpha$ has nothing to do with temperatures of the fluid, however, A and B may change, as will be apparent from the expression (3), according to temperatures of the fluid. For example, where the fluid is air, values of A and B increase, as illustrated in FIG. 10, in accordance as the air temperature increases. On the other hand, since a change in temperature of the fluid is detected on the temperature compensating resistor 73B, a value of $R_a$ changes according to the fluid temperature, and the value within {} in the expression (5) decreases in accordance as the air temperature or $R_a$ increases. Accordingly, the value r of the fixed resistance 77 is adjusted to a proper value, the increasing tendency of A and B in the expression (5) and the decreasing tendency of {} offset each other, and thus the signal V depends only on mass flow rate ρu of the fluid and not on the fluid temperature. That is, as shown in FIG. 8, the sides of the bridge are constituted of the flow detecting resistor 73A and a combined resistance of the temperature compensating resistor 73B and the fixed resistance 77, and thus the signal $V_a$ is subjected to a function only of the air mass flow rate and not influenced by the air temperature.

Figure 9:
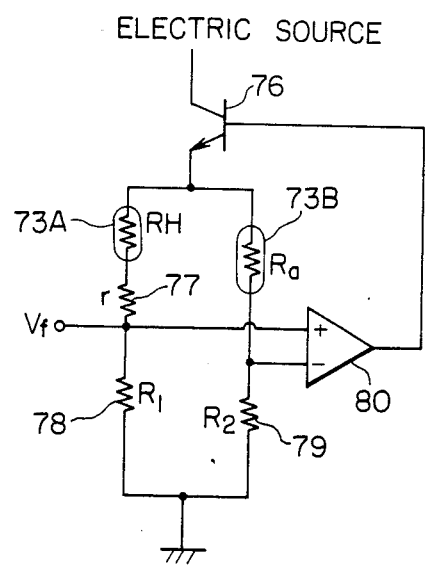
FIG. 9 is a schematic circuit diagrams of the fuel flow meter of one embodiment of this invention.
Figure 11:
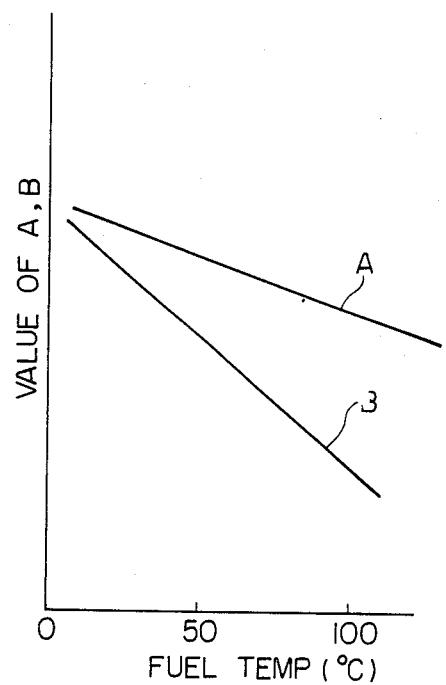

However, in the case of automobile fuel such as gasoline, gas oil or the like, a test result shows that values of A and B in the expression (3) decrease, contrary to the case of air, in accordance as the fuel temperature increases, as shown in FIG. 11. Accordingly, in the case of fuel flow rate measurement, it is necessary to constitute sides of the bridge, as shown in FIG. 9, of a combined resistance of the flow detecting resistor 73A and the fixed resistance 77 and the temperature compensating resistor 73B, each. A balance condition of the bridge in this case is:

$$(R_H + r) \cdot R_2 = R_1 \cdot R_a \quad (6)$$

and from expressions (1), (2), (3) and (6), the signal V is:

$$V_f^2 = \frac{R_1^2 S}{\alpha} (A + B\sqrt{\rho u}) \cdot \left\{ \frac{1}{R_{H0}} - \frac{1}{R_{H0}\left(\frac{R_1}{R_2} - \frac{r}{R_a}\right)} \right\} \quad (7)$$

The resistance value $R_a$ of the temperature compensating resistor 73B increases in accordance as the fuel temperature increases, and thus the value within {} in the expression (7) increases. Consequently, a decreasing tendency of the values of A and B to the fuel temperature of FIG. 11 is offset against the increasing tendency within {}, and thus the signal $V_f$ can be subjected to a function only of the fuel mass flow rate ρu and not influenced by the fuel temperature.

Figure 12:
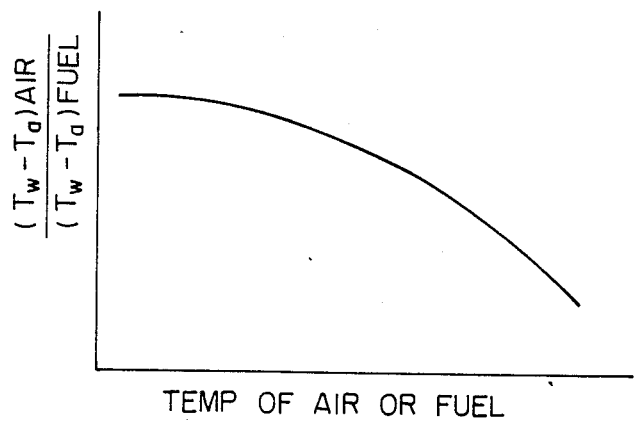
FIG. 12 is an explanatory drawing of a correction method according to this invention.

Now, the description given above will be summarized that in the case of measurement of fuel flow rate and air flow rate on the hot wire, the ratio of temperature difference between the flow detecting resistor and the temperature compensating resistor (ratio of the temperature difference in the case of air/fuel flow rate measurement) will have to be adjusted as shown in FIG. 12 in accordance with a rise of fuel and air temperatures.

Figure 13:
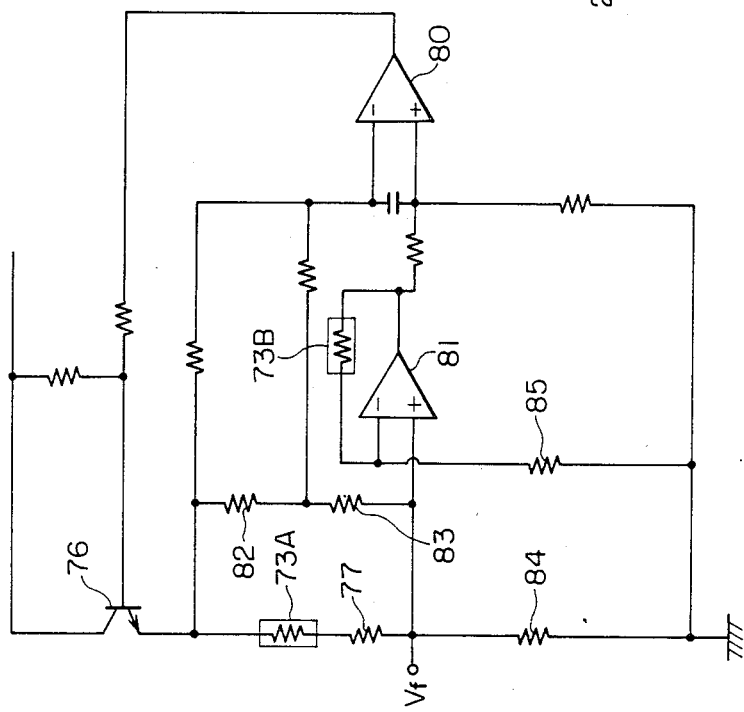
FIG. 13 is a circuit diagram of another embodiment of this invention.

FIG. 13 represents an example in which the invention is applied to a practical hot wire driving circuit. The series-fixed resistance 77 is added to the flow detecting resistor 73A, and the temperature compensating resistor 73B is inserted in a feedback loop of an operational amplifier 81. In this configuration, a current flowing in the temperature compensating resistor 73B can be set arbitrarily according to resistance values of fixed resistances 84, 85, 82, 83 and the operational amplifier 81, therefore a resistance value of 73B can be minimized. The temperature compensating resistor 73B can therefore be made small in size. The fuel passage is normally 3 mm to 10 mm in diameter, for which small-sized resistors 73A, 73B will be preferable, and the circuit of FIG. 13 may be used to advantage for fuel flow measurement. In the above description, both the flow detecting resistor 73A and temperature compensating resistor 73B are positive in temperature coefficient of the resistance value, namely the resistance value increases in accordance as the temperature gets high. The situation will be reversed where the temperature coefficient is negative like thermistor, and the circuit of FIG. 8 is used for fuel flow measurement, but the circuit of FIG. 9 is used for air flow measurement.

Figure 14:
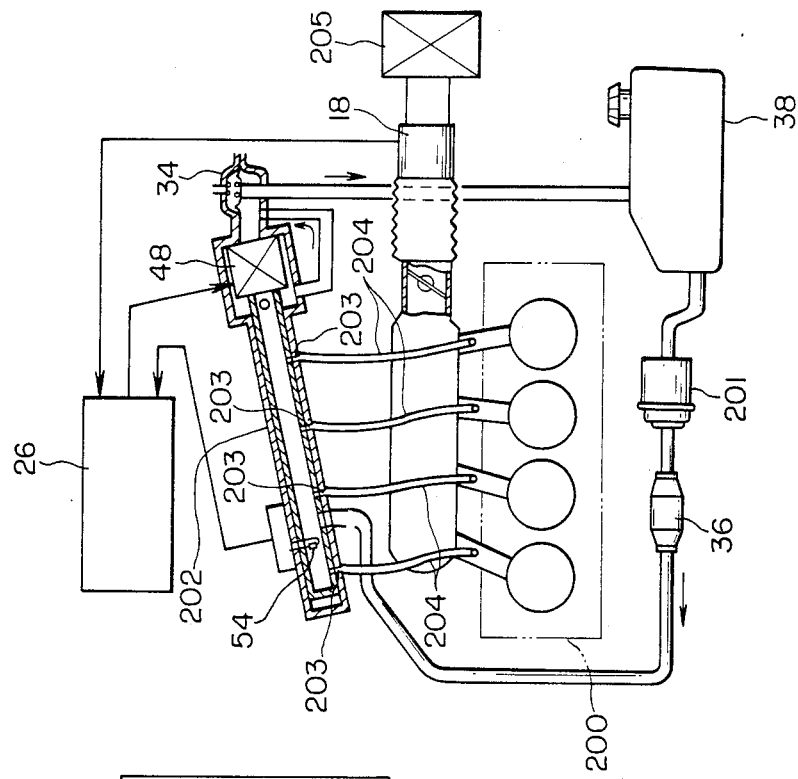
FIG. 14 is a system drawing of another embodiment of this invention.

Another embodiment of fuel controller using the fuel flow detector will be described next. FIG. 14 is a system block diagram when it is applied to a multi-point continuous fuel injection system. Like reference numerals represent like parts in FIG. 1. A fuel fed to an engine 200 is led to a fuel measuring chamber 202 from the fuel tank 38 through a fuel filter 201 and the fuel pump 36. A measuring hole 203 is perforated in the fuel measuring chamber 202 by the number of engine cylinders, and an opening area of the measuring hole 203 is controlled by the actuator 48. The fuel thus measured is injected near a suction hole of each engine cylinder through a fuel pipe 204. The fuel flow sensor 54 is provided at a portion where the fuel for one cylinder flows. The reason is that a detection error due to a fuel vapor bubble must be minimized. That is, as will be apparent from the drawing, the fuel measuring chamber 202 is installed slantingly to the horizontal plane, which is ready for letting the fuel vapor bubble produced in a fuel piping right upward of the drawing on its buoyancy. Accordingly, there flows in the fuel measuring chamber 202 a fuel to return to the fuel tank 38 by way of the fuel regulator 34 other than the fuel to be fed to the engine. As will be apparent from the drawing, a supply fuel for one cylinder only flows in a portion whereat the fuel flow sensor 54 is installed, which is kept from an influence of the vapor bubble in construction. The air sucked in the engine 200 has the flow rate detected by the air flow sensor (hot wire sensor) 18 by way of an air cleaner 205 and is then led to the control unit 26. A detection fuel signal of the fuel flow sensor 54 is led to the control unit 26, likewise. A close loop control processing similar to the above-mentioned is applied here, and an actuator operating signal is outputted to the actuator 48.

Figure 15:
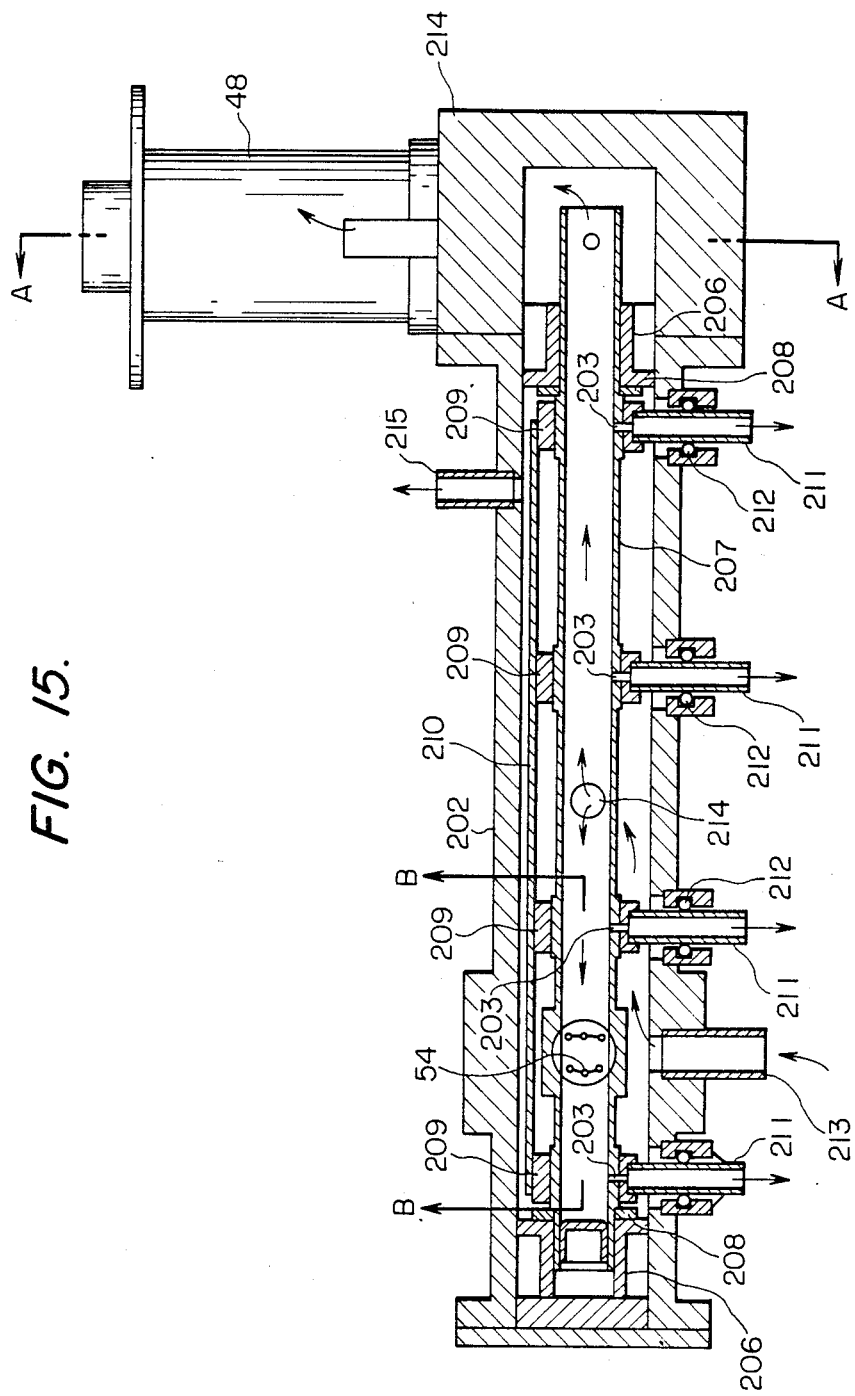
FIG. 15 is a detailed drawing of a fuel measuring unit of FIG. 14.
Figure 16:
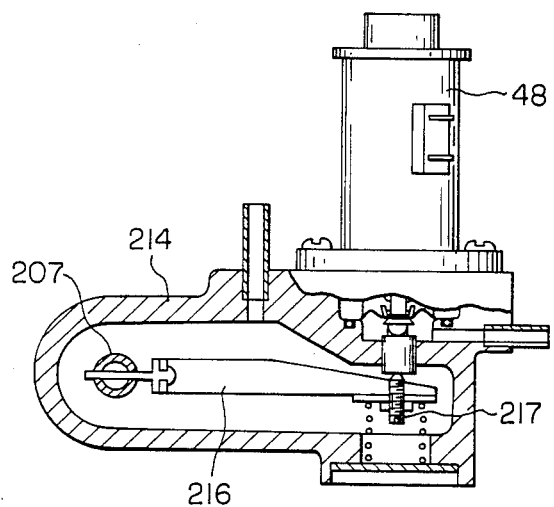
FIG. 16 is a detailed drawing of an actuator 48 of FIG. 14.
Figure 17:
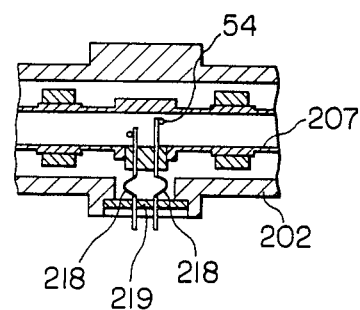
FIG. 17 is a detailed drawing of a fuel flow measuring unit.

Next, the fuel measuring chamber 202 which is a main part of the above system diagram will be described in detail. FIG. 15 is a sectional view of the main part thereof. A measuring pipe 207 is provided on a bearing 206 in the fuel measuring chamber 202, and a move in the thrust direction is limited by a thrust preventive 208. The measuring hole 203 is perforated in the measuring pipe 207 at equal intervals to cope with the number of cylinders. A cylinder 209 with a measuring hole equal in diameter to the measuring hole 203 perforated therein is set so as to match with each measuring hole 203 of the measuring pipe 207, and each cylinder 209 is fixed through a leaf spring 210. The measuring hole on the cylinder 209 side is led to the engine 200 through a derivation pipe 211. For extracting the derivation pipe 211 externally of the fuel measuring chamber 202, it is necessary to keep a security of the fuel. Further, it is necessary for the cylinder 209 to move after a radial move (centrifugal whirling) of the measuring pipe 207 so that a smooth sliding motion will not be prevented by centrifugal whirling of the measuring pipe 207. In this embodiment, the leaf spring 210 is functional therefor. Accordingly, to fix the derivation pipe 211 on the fuel measuring chamber 202 is not to obtain the above-mentioned move. In this embodiment, therefore, requirements of both the two will be satisfied by a flexible member 212 like a rubber O-ring. Here, only the derivation pipe 211 on the extreme left of the drawing is fixed on the fuel measuring chamber 202, thereby regulating the move of each cylinder 209 in the thrust direction. In the above constitution, the fuel fed from the fuel pump 36 is led into the fuel measuring chamber 202 by way of an inlet pipe 213 and then flows into the measuring pipe 207 through a measuring pipe introducing hole 214. The fuel having flowed thereinto is separated left and right of the drawing and then fed into a suction pipe of each cylinder through each measuring hole 203. Then, the fuel flow sensor 54 consisting of a hot wire sensor is installed at a position where the fuel for one cylinder only flows, and thus the fuel flow is detected thereon. The fuel having flowed rightward of the drawing is fed partly into the suction pipe through the measuring hole 203, however, the remaining fuel flows into the lever chamber 214 and is then returned to the fuel tank 38 through the fuel pressure regulator 34. The fuel between the fuel measuring chamber 202 and the measuring pipe 207 is introduced to the fuel pressure regulator 34 from a discharge pipe 215, likewise. In the above constitution, the measuring pipe 207 slides in the circumferential direction, but the sliding motion covers only a short period from closing the diameter of the measuring hole 203 full to opening it full. Consequently, to drive it directly on the actuator 48 is next to impossible for control sensitivity of the actuator 48. In view of the above situation, a mechanism shown in FIG. 16 is employed in this embodiment. FIG. 16 is a sectional view taken on line A—A of FIG. 15. That is, a lever 216 is fixed on an end part of the measuring pipe 207 projecting on the lever chamber 214, and a stroke displacement of the actuator 48 is given to another end of the lever 216. Then, a reference numeral 217 denotes an adjusting screw for adjusting an initially set position of the measuring hole 213. Thus, a fine change in the circumferential direction is given to the measuring pipe 207 according to the large change in stroke of the actuator 48, and further an effect of doubling a driving force of the actuator 48 is also obtainable thereby. FIG. 17 is a sectional view taken on line B—B of FIG. 15. That is, the fuel flow sensor 61 is fixed and so provided on the measuring pipe 207, and the signal is extracted outward of the fuel measuring chamber 202 on the circumference thereof through a lead wire 218. Needless to say, both are fixed on an insulating terminal block so as to retain an electrical insulation with the fuel measuring chamber 202. Thus, the system is constituted such that a multi-point fuel injection can be measured at a relatively easy and high machining precision and that an influence of the fuel vapor bubble can be minimized at all times.

Figure 18:
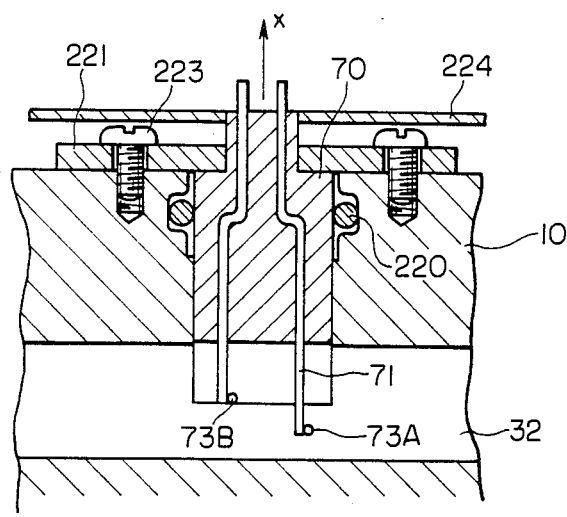
FIG. 18 is an explanatory drawing of how to mount the fuel flow meter.

In the embodiment, the fuel flow sensor works as an essential element, however, what is particularly to be cautioned when the hot wire sensor is applied thereto is that a fuel leakage from a portion whereat the sensor is installed must be prevented perfectly. FIG. 18 shows one example of the method. The hot wire sensors (73A, 73B) disposed in the fuel passage 32 are inserted in the body 10 in the form of having the support rod 71 molded with the resin 70 having an electrical insulating property, as described in detail in FIG. 3. Here, a tightness can be kept thoroughly between the support rod 71 and the resin 70 through molding, however, the fuel is capable of leaking from a clearance between the resin 70 and the body 10. In this embodiment, a flexible member 220 such as rubber O-ring or the like is provided between the two, thereby preventing the leakage. Further, a method to fix a retainer 221 on the body with a screw 223 is employed so as to suppress a move of the resin 70 in the direction X. A reference numeral 224 denotes a circuit substrate.

As described above, according to this invention, an accurate rate of fuel flow is obtainable on a fuel flow detector embodying the invention, and further a fuel controller wherein a high precision of air-fuel ratio is obtainable by means of the fuel flow detector can be provided in addition.

What is claimed is:
1. A fuel controller, comprising:
 (a) air detecting means including a first flow measuring resistance to be disposed in a suction air passage and having a temperature dependency characteristic and a first temperature compensating resistance having a temperature dependency characteristic similar to said first flow measuring resistance for measuring air flow in said suction air passage;
 (b) fuel detecting means including a second flow measuring resistance to be disposed in a fuel passage and having a temperature dependency characteristic similar to said first flow measuring resistance and a second temperature compensating re- sistance for measuring fuel flow in said fuel passage;

(c) correcting means provided in said air detecting means and said fuel detecting means so as to minimize the ratio $\Delta Y\alpha/DTf$ of a temperature difference $\Delta Ta$ between said first low measuring resistance and said first temperature compensating resistance to a temperature difference $\Delta Tf$ between said second flow measuring resistance and said second temperature compensating resistance in accordance with a temperature rise;

(d) controlling means for generating a control signal to regulate the flow of fuel so that signals of said air detecting means and said fuel detecting means are related in a predetermined manner to each other; and (e) fuel flow regulating means for controlling the fuel flowing in said fuel passage according to the control signal of said controlling means.

2. The fuel controller for internal combustion engine as defined in claim 1, wherein said first and second flow measuring resistances and said first and second temperature compensating resistances each have a positive temperature characteristic, and said correcting means comprises a resistance connected in series with said first temperature compensating resistance and another resistance connected in series with said second flow measuring resistance.

3. The fuel controller for internal combustion engine as defined in claim 1, wherein said first and second flow measuring resistances and said first and second temperature compensating resistances each have a negative temperature characteristic, and wherein said correcting means comprises a resistance connected in series with said first flow measuring resistance and another resistance connected in series with said second temperature compensating resistance.

4. A fuel flow detector, comprising:

(a) a first circuit including a flow measuring resistance element disposed in a fuel passage and having a resistance value which varies linearly with variation in temperature so that the resistance thereof increases with increase in temperature;

(b) a second circuit connected in parallel with said first circuit and including a temperature compensating resistance element disposed in said fuel passage and having a resistance value which varies linearly with variation in temperature so that the resistance thereof increases with increase in temperature;

(c) means for supplying a current to the parallel connection of said first and second circuits;

(d) detecting means for detecting a potential produced by said flow measuring resistance to produce an output signal;

(e) an additional resistance forming part of said first circuit and connected in series with said flow measuring resistance; and (f) current controlling means connected to said first and second circuits for comparing the potential produced across the series combination of said flow measuring resistance and said additional resistance with a potential produced across said temperature compensating resistance and for controlling said current supplying means to control the current flowing into said flow measuring resistance so as to minimize the deviation.

* * * * *